United States Patent
Liu et al.

(10) Patent No.: US 10,155,563 B2
(45) Date of Patent: Dec. 18, 2018

(54) BIKE BRAKE LEVER WITH ADJUSTABLE SENSOR DEVICE

(71) Applicant: LEE CHI ENTERPRISES CO., LTD., Changhua, Changhua County (TW)

(72) Inventors: Wen-Tsung Liu, Changhua (TW); Guo-Yuan Huang, Changhua (TW)

(73) Assignee: LEE CHI ENTERPRISES CO., LTD., Changhua (TW)

( * ) Notice: Subject to any disclaimer, the term of this patent is extended or adjusted under 35 U.S.C. 154(b) by 0 days.

(21) Appl. No.: 15/496,468

(22) Filed: Apr. 25, 2017

(65) Prior Publication Data

US 2018/0304959 A1  Oct. 25, 2018

(51) Int. Cl.
*B62L 3/02* (2006.01)
*B62K 23/02* (2006.01)
*B62K 23/06* (2006.01)

(52) U.S. Cl.
CPC ............... *B62L 3/02* (2013.01); *B62K 23/06* (2013.01); *B62K 2207/00* (2013.01)

(58) Field of Classification Search
CPC ........ B62K 23/00; B62K 23/02; B62K 23/06; B62K 2207/00; B62L 3/02
See application file for complete search history.

(56) References Cited

U.S. PATENT DOCUMENTS

| | | | | | |
|---|---|---|---|---|---|
| 5,448,927 | A | * | 9/1995 | Lumpkin | B62K 23/06 74/489 |
| 5,564,311 | A | * | 10/1996 | Chen | B62K 23/06 74/489 |
| 5,669,268 | A | * | 9/1997 | Tsai | B62K 23/06 74/489 |
| 5,979,266 | A | * | 11/1999 | Nagano | B62L 3/02 74/489 |
| 6,161,448 | A | * | 12/2000 | Wang | B62K 23/06 74/489 |
| 6,739,133 | B2 | * | 5/2004 | Barnett | B60T 7/08 60/594 |
| 8,622,181 | B2 | * | 1/2014 | Tsai | B62L 3/02 188/2 D |
| 2009/0084221 | A1 | * | 4/2009 | Liu | B62K 23/06 74/502.2 |
| 2012/0265413 | A1 | * | 10/2012 | Lin | B62K 23/06 701/51 |
| 2013/0228405 | A1 | * | 9/2013 | Tsai | B62K 23/06 188/344 |

FOREIGN PATENT DOCUMENTS

DE  29918245 U1 *  2/2000 ............ B62K 23/06
EP  1645498 A1 *  4/2006 ........... B60R 25/086

* cited by examiner

*Primary Examiner* — Adam D Rogers
(74) *Attorney, Agent, or Firm* — Rabin & Berdo, P.C.

(57) ABSTRACT

A bike brake lever with an adjustable sensor device includes a main body and a sensor device. The main body has a symmetry plane longitudinally defined through the main body and a pivot seat mounted on the main body and located along the symmetry plane. The sensor device is rotatably connected with the pivot seat of the main body and has a pivot portion rotatably connected with the pivot seat and a detecting portion connected with the pivot portion. The sensor device of the bike brake lever is adjustable for position switch. The bike brake lever is universal for both sides of a bike, meets the user's demand, and also reduces the manufacture cost.

10 Claims, 8 Drawing Sheets

BIKE BRAKE LEVER WITH ADJUSTABLE SENSOR DEVICE

BACKGROUND OF THE INVENTION

1. Field of the Invention

The present invention relates a bike brake controlling apparatus, more particularly to a bike brake lever with an adjustable sensor device.

2. Description of Related Art

A conventional electric bike or electric scooter is driven by an electric motor to move. When the electric bike or the electric scooter needs to stop, a brake lever is pressed to control a bike brake to stop the movement of the electrical bike or electric scooter and to switch the electrical motor off at the same time. If the electric motor is still operating when the bike brake is pressed, the bike brake will be damaged easily by a friction force between the bike brake and a wheel. Therefore, the brake lever used in the electrical bike or electric scooter has to combine with a sensor to detect and control synchronously the action of the electric motor to prevent the bike brake from being damaged.

A conventional brake lever with a sensor is disclosed with reference to FIGS. 7 and 8. In FIG. 7, a brake lever 80 includes a lever mount 81, a sensor 82 mounted and hidden in a side of the lever mount 81, and a hand lever 83 connected with the lever mount 81. When the brake lever 80 is actuated by pressing the hand lever 83, the sensor 82 will detect the movement of the hand lever 83 to stop the electric motor synchronously.

In FIG. 8, a brake lever 90 includes a lever mount 91, a circuit breaker 92 attached on a side of the lever mount 91, and a hand lever 93 connected with the lever mount 91. When the hand lever 93 is pressed, the circuit breaker 92 will be actuated and break a connection with the electric motor to stop rotating.

The conventional brake lever is usually mounted on the right side and the left side of the bike in a pair for the hands of the user to hold and to brake. With reference to FIGS. 7 and 8, the sensor 82 or the circuit breaker 92 is mounted inside or outside of the brake lever 80, 90 and is located at a specific side unchangeably. The brake lever 80, 90 designed for the right side only can be used and mounted in a right side of the bike and cannot be changed to a left side of the bike. Thus, the brake lever 80, 90 must be designed for different sides of the bike and are unchangeable in location, which increases the manufacture cost and is inconvenient in assembly and maintenance.

To overcome the shortcomings of the conventional brake lever, the present invention provides a bike brake lever with an adjustable sensor device to mitigate or obviate the aforementioned problems.

SUMMARY OF THE INVENTION

The main objective of the present invention is to provide a bike brake lever with an adjustable sensor device The bike brake lever with an adjustable sensor device includes a main body and a sensor device. The main body has a symmetry plane longitudinally defined through the main body and a pivot seat mounted on the main body and located along the symmetry plane. The sensor device is rotatably connected with the pivot seat of the main body and has a pivot portion rotatably connected with the pivot seat and a detecting portion connected with the pivot portion.

The sensor device of the bike brake lever is adjustable for position switch demand. The bike brake lever is universal for both sides of a bike, meets the demand of the user, and also reduces the manufacture cost.

Other objects, advantages, and novel features of the invention will become more apparent from the following detailed description when taken in conjunction with the accompanying drawings.

DETAILED DESCRIPTION OF PREFERRED EMBODIMENT

Figure 1:
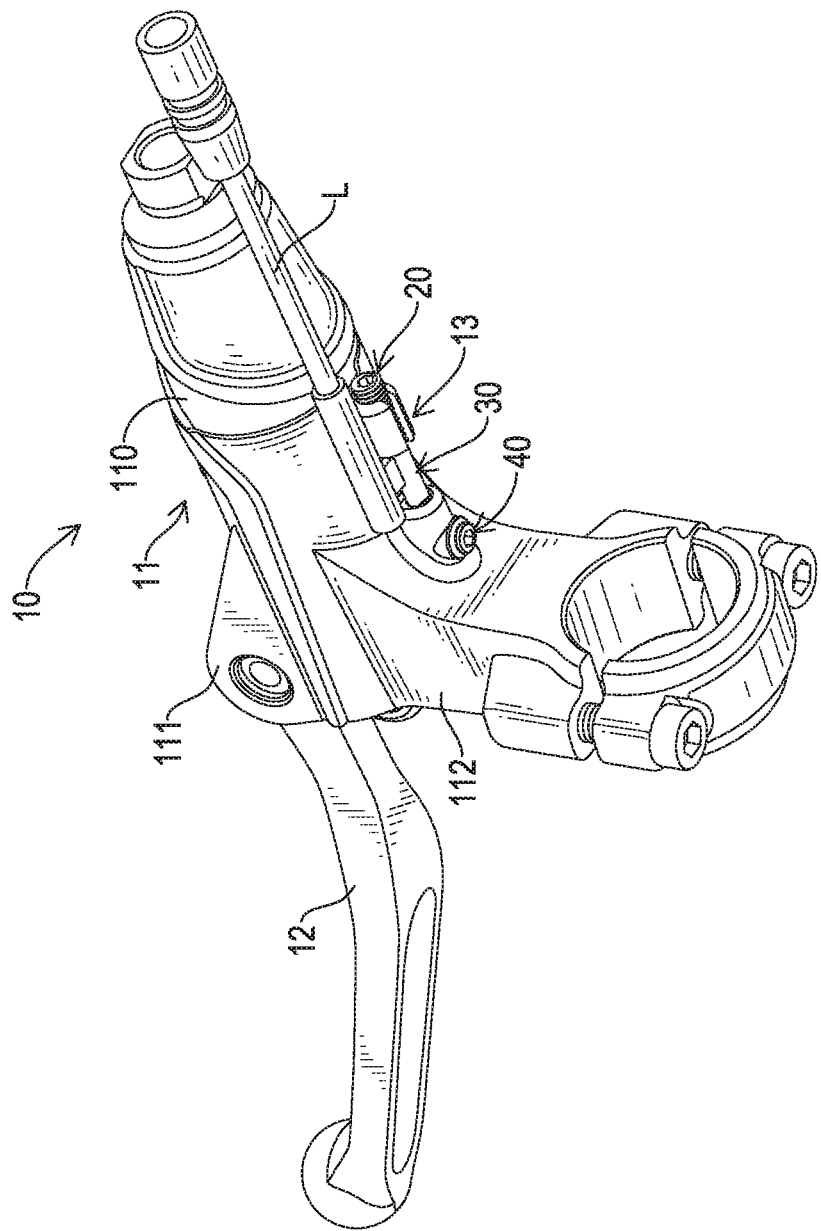
FIG. 1 is a perspective view of a bike brake lever with an adjustable sensor device in a left-hand mode in accordance with the present invention.

With reference to FIG. 1, a preferred embodiment of a bike brake lever includes a main body 10, an adjusting unit 20, a sensor device 30, and a fixing bolt 40.

Figure 2:
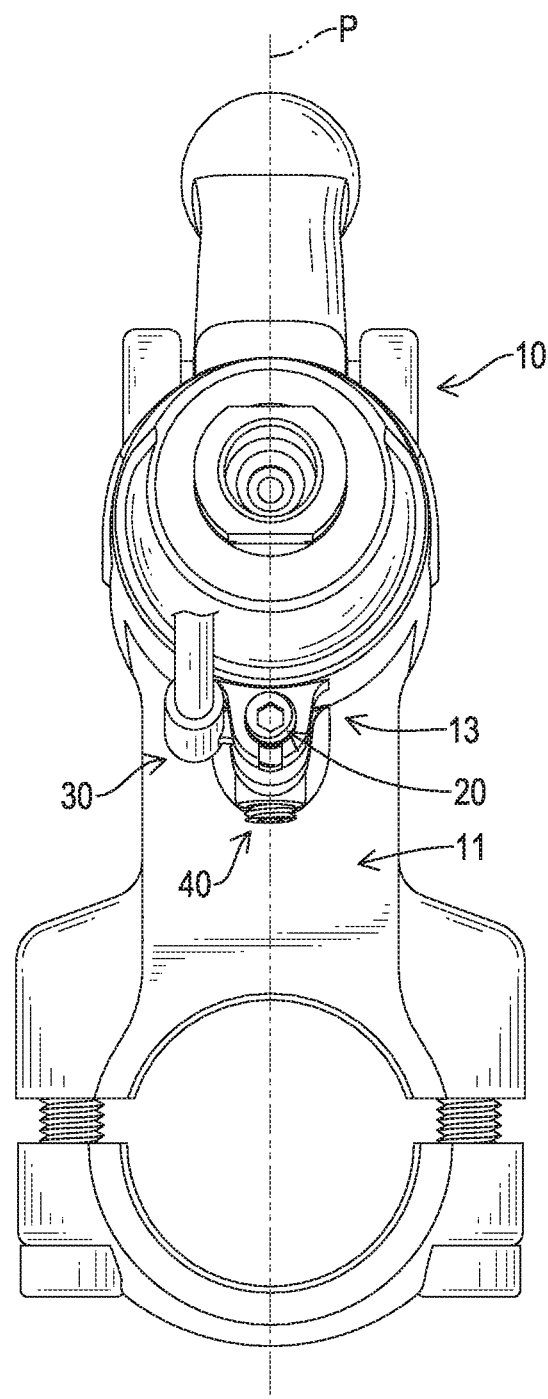
FIG. 2 is an enlarged side view of the bike brake lever in FIG. 1.
Figure 3:
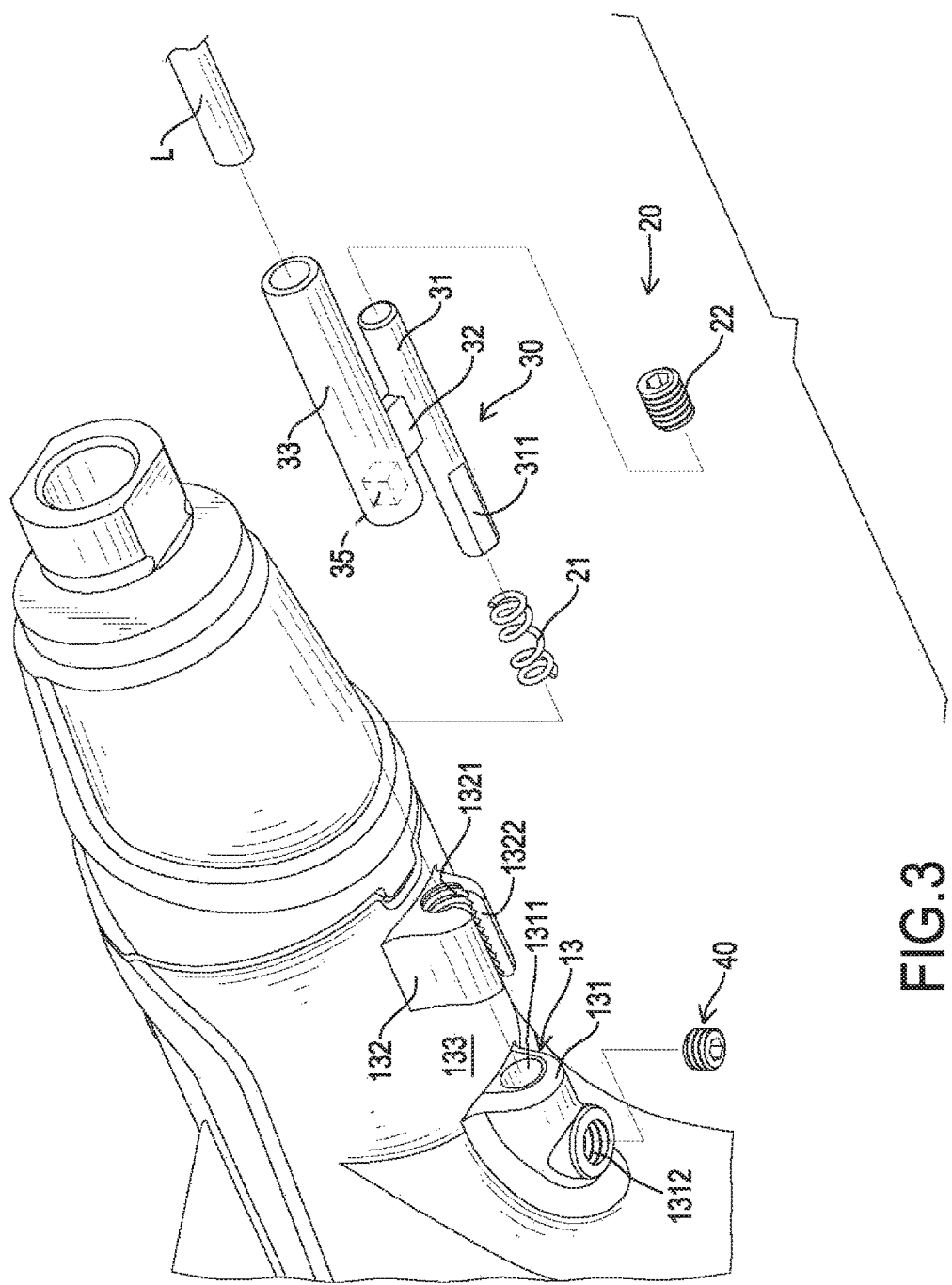
FIG. 3 is an enlarged exploded perspective view of the bike brake lever in FIG. 1.

With references FIGS. 1 to 3, the main body 10 includes a lever mount 11, a hand lever 12, and a pivot seat 13. The lever mount 11 has a connecting seat 110 for connecting with a brake line, a hand lever seat 111 for mounting the hand lever 12, and an assembling portion 112 for mounting on a hand grip of a bike.

With reference to FIG. 2, a symmetry plane P is longitudinally defined through the hand lever seat 111 and dichotomizes the hand lever seat 111.

The hand lever 12 is mounted pivotally on the hand lever seat 111 and can be pressed by a user to brake.

The pivot seat 13 may be integrally formed on the lever mount 11 or detachably connected with the lever mount 11. Preferably, the pivot seat 13 is formed integrally on a bottom of the lever mount 11 along the symmetry plane P and faces toward the assembling portion 112.

The pivot seat 13 is tubular and includes a positioning portion 131, a support portion 132, and a notch 133 formed between the positioning portion 131 and the support portion 132.

The positioning portion 131 is tubular, is integrally formed on a bottom of the connecting seat 110, is partially connected with the assembling portion 112, and has a pivot hole 1311 and a positioning hole 1312 radially communicating with the pivot hole 1311.

The support portion 132 is integrally formed on the bottom of the connecting seat 110, and has a supporting hole 1321 coaxially aligned with the pivot hole 1311 and a groove 1322 communicating with the supporting hole 1321. The groove 1322 has threads formed around an inner periphery of the support portion 132.

With reference to FIGS. 1 and 3, the adjusting unit 20 is mounted on the pivot seat 13 to adjust the position of the sensor device 30. The adjusting unit 20 may be applied to springs, screws, bolts or other mechanical components to adjust the position of the sensor device 30. Preferably, the adjusting unit 20 includes an adjusting spring 21 and an adjusting bolt 22. The adjusting spring 21 is mounted in the pivot hole 1311. The adjusting bolt 22 is mounted in the positioning hole 1312 by threads.

With reference to FIGS. 1 and 3, the sensor device 30 is rotatably connected with the pivot seat 13 of the main body 10 and is pivotally rotated relative to the pivot seat 13. The sensor device 30 is H-shaped and includes a pivot portion 31, a connecting portion 32 and a detecting portion 33. The pivot portion 31 is cylindrical and corresponds in shape to the pivot hole 1311 and the positioning hole 1312. A length of the pivot portion 31 is smaller than a length of the pivot seat 13 and is longer than a length of the notch 133. The pivot portion 31 is rotatably mounted in the pivot hole 1311 and the positioning hole 1312. The adjusting spring 21 is compressed by one end of the pivot portion 31, which further includes two flat positioning surfaces 311 formed on an end of the pivot portion 31.

The connecting portion 32 is integrally connected with the middle of the pivot portion 31, is parallel with the positioning surfaces 311, and is perpendicular to an axial direction of the pivot portion 31. A thickness of the connecting portion 32 is smaller than a width of the groove 1322, and a width of the connecting portion 32 is smaller than a width of the notch 133.

Figure 6:
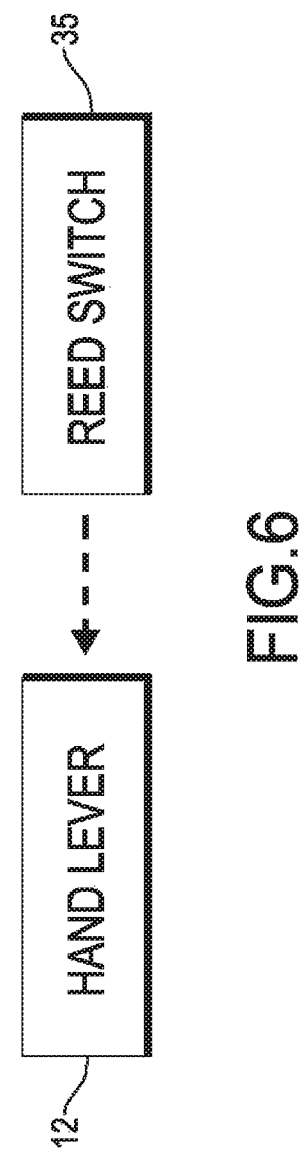
FIG. 6 is a block diagram of a reed switch and a hand lever.
Figure 7:
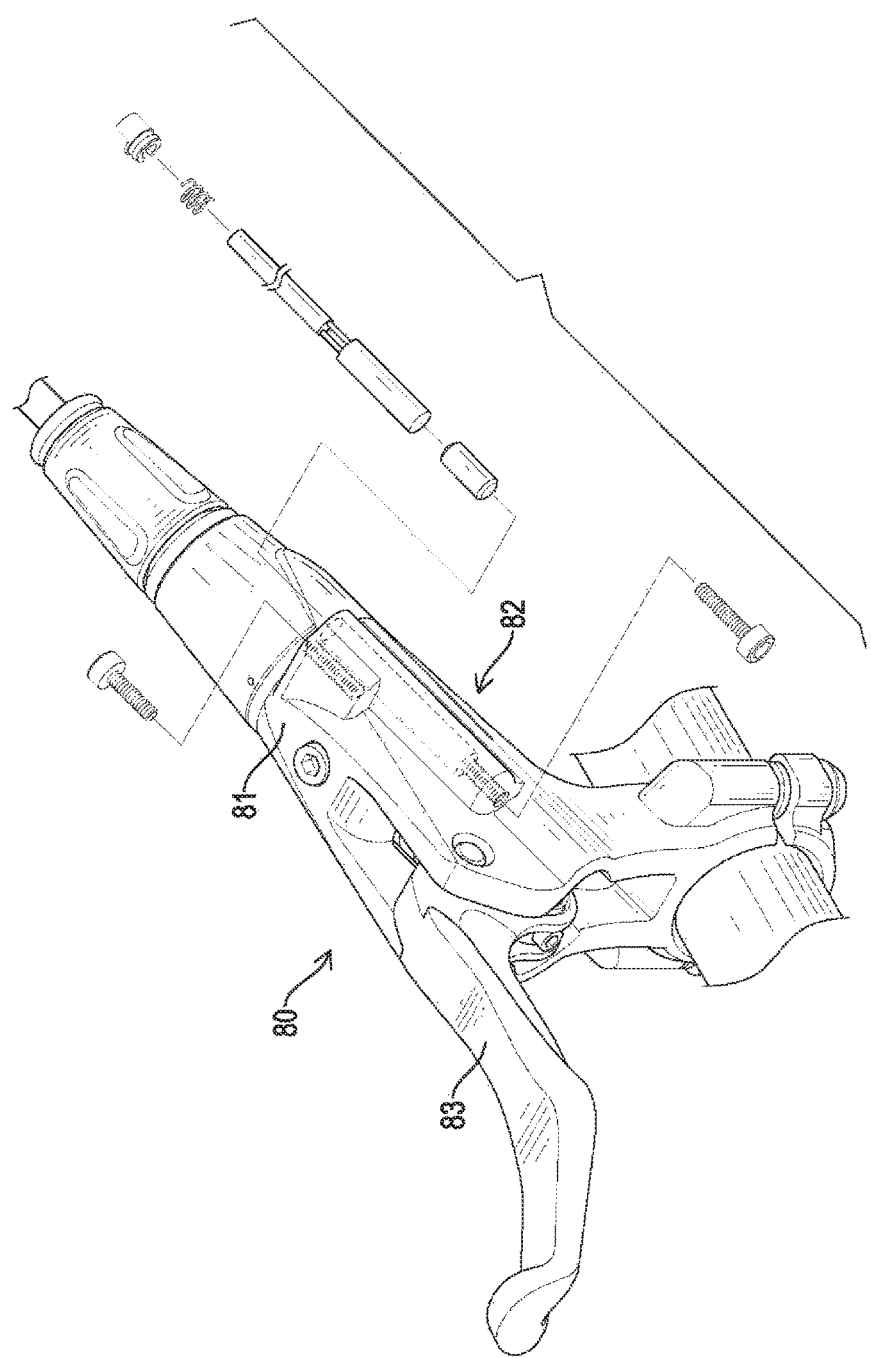
FIG. 7 is an exploded perspective view of a conventional bike brake lever.
Figure 8:
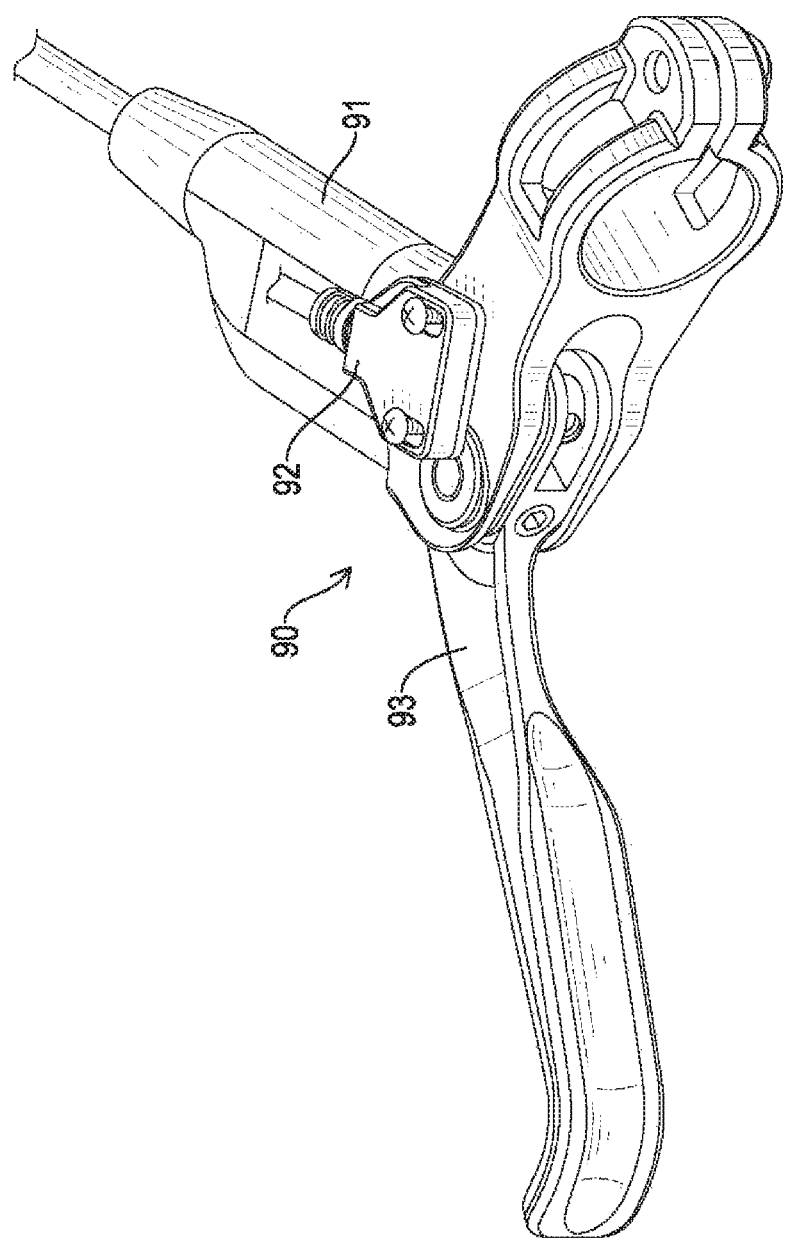
FIG. 8 is a perspective view of another conventional bike brake lever.

With reference to FIGS. 3 and 6, the detecting portion 33 is integrally connected with an end of the connecting portion 32 opposite the pivot portion 31. The detecting portion 33 has a reed switch 35 inside to detect the movement of the hand lever 12 and to control the electric motor and connect with a cable L for transmitting signals of the reed switch 35.

The fixing bolt 40 is mounted in the positioning hole 1312 of the positioning portion 131 to abut and to lock the sensor device 30.

Figure 4:
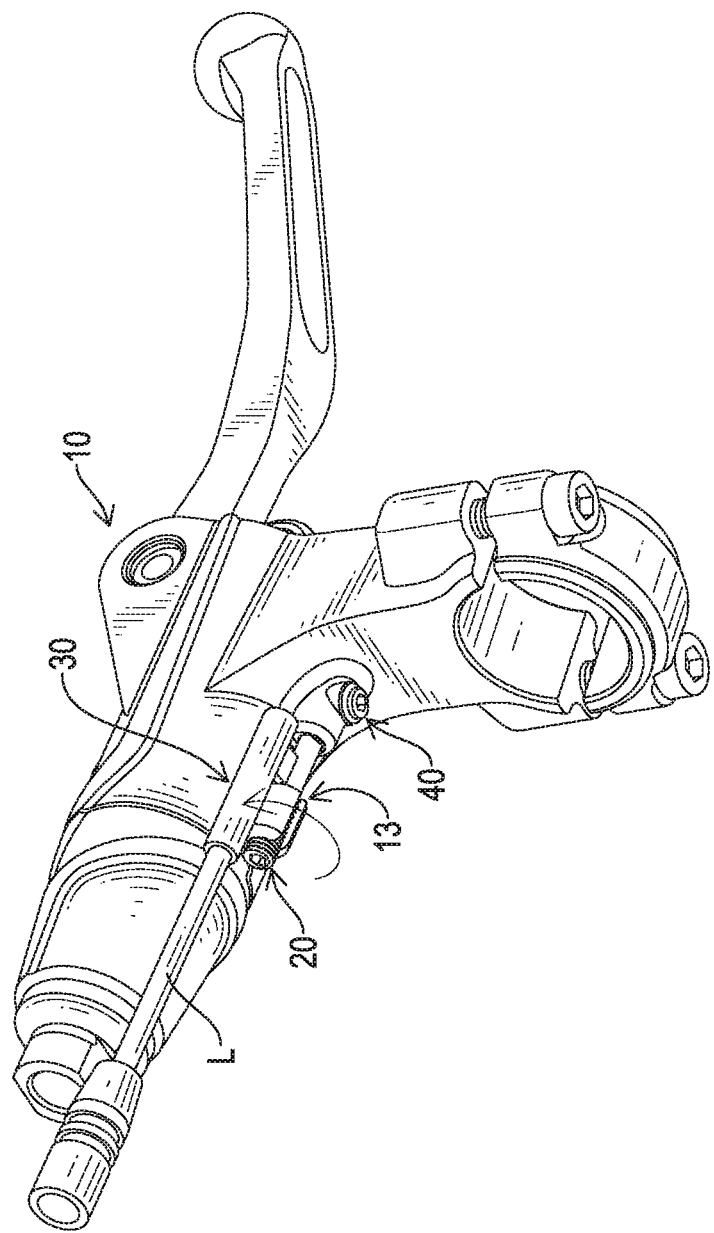
FIG. 4 is a perspective view of the bike brake lever in FIG. 1 in a right-hand mode.
Figure 5:
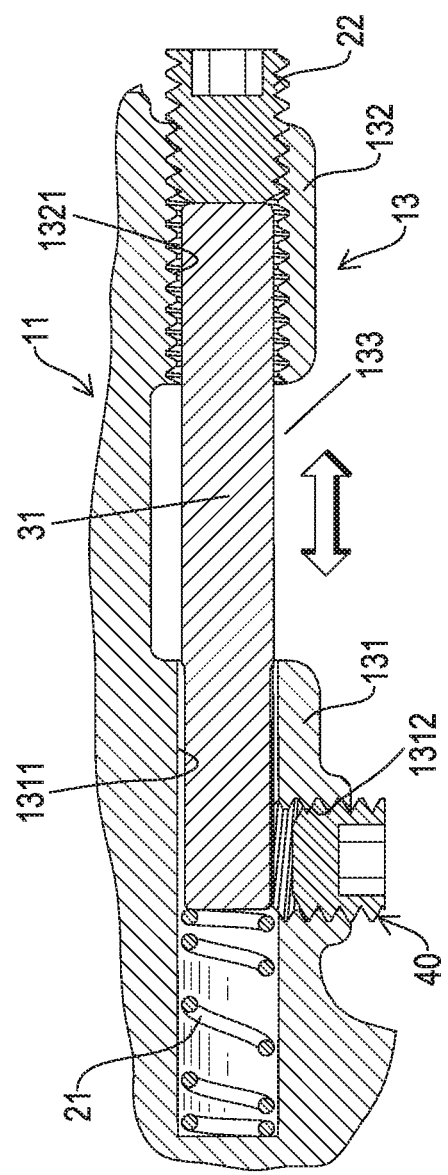
FIG. 5 is an enlarged operational cross-sectional side view of the bike brake lever in FIG. 1.

With references FIGS. 3 to 5, the pivot portion 31 of the sensor device 30 is mounted on the pivot seat 13 via the supporting hole 1321, the notch 133 and the pivot hole 1311. The connecting portion 32 passes through the groove 1322 and is located in the notch 133. The adjusting spring 21 is compressed by the pivot portion 31, and the adjusting bolt 22 is mounted in the supporting hole 1321 of the support portion 132 and abuts one end of the pivot portion 31 to assemble the sensor device 30 on the pivot seat 13, so the sensor device 30 can be pivoted relative to the pivot seat 13. Therefore, the sensor device 30 and the adjusting unit 20 are detachable and are easy to assemble on the pivot seat 13 of the main body 10.

With reference to FIG. 5, the sensor device 30 can be adjusted by rotating the adjusting bolt 22 to move the pivot portion 31 of the sensor device 30 along an axis of the supporting hole 1321. The adjusting spring 21 also can be compressed by the pivot portion 31 to generate an elasticity to push the pivot portion 31. Therefore, the detecting portion 33 of the sensor device 30 can be moved to an optimal position corresponding to the position of the brake components and will precisely detect the movement of the brake lever.

A left hand mode of the sensor device 30 shown in FIG. 1 can be changed to a right hand mode as shown in FIG. 4 by flipping the pivot seat 13 of the main body 10. The bike brake lever is universal for both sides of a bike and meets the user's demand by flipping the sensor device 30 and can also reduce the manufacture cost.

With references FIGS. 3 and 5, the sensor device 30 is flipped to a specific side and is locked firmly by screwing the fixing bolt 40 which abuts one of the positioning surfaces 311 of the pivot portion 31.

The detecting position 33 of the sensor device 30 can be adjusted by the adjusting unit 20 or locked by the fixing bolt 40. The assembled location of the sensor device 30 can also be changed simply by flipping the sensor device 30 to assemble the sensor device 30 on the different sides of the bike. The sensor device 30 or the adjusting unit 20 can also be detached individually for maintenance, repair, or replacement.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bike brake lever, comprising:
a main body having a lever mount and having a pivot seat and a symmetry plane longitudinally defined through the lever mount and dichotomizing the lever mount, wherein the pivot seat is mounted on the lever mount, is located along the symmetry plane, includes a positioning portion having a pivot hole defined therein, a support portion that is coaxially aligned with the positioning portion at a spaced interval, a supporting hole defined therein, and has a groove that communicates with the supporting hole, and a notch formed between the positioning portion and the support portion;
a sensor device rotatably connected with the pivot seat of the main body and having a pivot portion mounted in the pivot hole and rotatably connected with the pivot seat;
a detecting portion disposed parallel to the pivot portion and having a reed switch provided therein to detect movement of a hand lever; and
a connecting portion connected between the pivot portion and the detecting portion; and
an adjusting unit mounted on the pivot seat to adjust an assembled position of the sensor device.

2. The bike brake lever as claimed in claim 1, wherein two positioning surfaces are formed on the pivot portion, and a fixing bolt selectively abuts one positioning surface of the two positioning surfaces of the pivot portion.

3. The bike brake lever as claimed in claim 1, wherein the adjusting unit includes an adjusting spring mounted in the pivot hole of the positioning portion and elastically compressed by the pivot portion of the sensor device, and an adjusting bolt mounted in a positioning hole of the support portion and abutting the pivot portion of the sensor device.

4. The bike brake lever as claimed in claim 3, wherein the positioning portion of the pivot seat includes a positioning hole radially communicating with the pivot hole, and a fixing bolt is mounted in the positioning hole of the positioning portion to abut the positioning portion of the pivot seat of the main body.

5. The bike brake lever as claimed in claim 3, wherein two positioning surfaces are formed on the pivot portion, and a fixing bolt selectively abuts one positioning surface of the two positioning surfaces of the pivot portion.

6. The bike brake lever as claimed in claim 3, wherein the pivot seat is integrally formed on a bottom of the lever mount.

7. The bike brake lever as claimed in claim 6, wherein the positioning portion of the pivot seat includes a positioning hole radially communicating with the pivot hole, and a fixing bolt is mounted in the positioning hole of the positioning portion to abut the positioning portion of the pivot seat of the main body.

8. The bike brake lever as claimed in claim 6, wherein two positioning surfaces are formed on the pivot portion, and a fixing bolt selectively abuts one positioning surface of the two positioning surfaces of the pivot portion.

9. The bike brake lever as claimed in claim 1, wherein the positioning portion of the pivot seat includes a positioning hole radially communicating with the pivot hole, and a fixing bolt mounted in the positioning hole of the positioning portion to abut the positioning portion of the pivot seat of the main body.

10. The bike brake lever as claimed in claim 9, wherein two positioning surfaces are formed on the pivot portion, and a fixing bolt selectively abuts one positioning surface of the two positioning surfaces of the pivot portion.

\* \* \* \* \*